US008040423B2

(12) United States Patent
Sato

(10) Patent No.: US 8,040,423 B2
(45) Date of Patent: Oct. 18, 2011

(54) IMAGE PICKUP APPARATUS, METHOD OF CONTROLLING IMAGE PICKUP AND COMPUTER-READABLE STORAGE MEDIUM

(75) Inventor: Yutaka Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1441 days.

(21) Appl. No.: 11/194,702

(22) Filed: Aug. 2, 2005

(65) Prior Publication Data

US 2006/0028579 A1    Feb. 9, 2006

(30) Foreign Application Priority Data

Aug. 5, 2004   (JP) ................ P2004-229661

(51) Int. Cl.
*G02B 13/16* (2006.01)
*H04N 5/225* (2006.01)

(52) U.S. Cl. ..... 348/335; 348/340; 348/362; 348/222.1; 348/227.1; 348/228.1

(58) Field of Classification Search ............ 348/335, 348/340, 362, 222.1, 227.1, 228.1
See application file for complete search history.

(56) References Cited

U.S. PATENT DOCUMENTS

| 5,043,816 A * | 8/1991 | Nakano et al. ........... 348/333.01 |
| 6,570,614 B1 * | 5/2003 | Kubo et al. ............... 348/231.6 |
| 6,710,808 B1 * | 3/2004 | Yamagishi ................. 348/362 |

FOREIGN PATENT DOCUMENTS

| JP | 03-092832 | 4/1991 |
| JP | 2001-008087 | 12/2001 |
| JP | 2004-085697 | 3/2004 |
| JP | 2004-135029 | 4/2004 |

* cited by examiner

*Primary Examiner* — Yogesh Aggarwal
(74) *Attorney, Agent, or Firm* — Finnegan, Henderson, Farabow, Garrett & Dunner, LLP

(57) ABSTRACT

An image-pickup apparatus for picking up an image using a solid-state image pickup device. The apparatus includes a first and a second input receiving parts for receiving different input signals in accordance with a user's input operation, an image-pickup-condition determination part for determining an optimum image-pickup condition to be set at image-pickup time, and an image-pickup controller for controlling such that the image-pickup-condition determination part starts a determination operation at input-signal receiving time of the first receiving part, when the input signal is received continuously and the second input receiving part receives an input signal after the optimum image-pickup condition is determined, an image picked up by applying the image-pickup condition determined to be the best is captured, and when the second input receiving part receives the input signal on the other conditions, a plurality of pickup images are captured continuously by applying different image-pickup conditions in sequence.

7 Claims, 9 Drawing Sheets

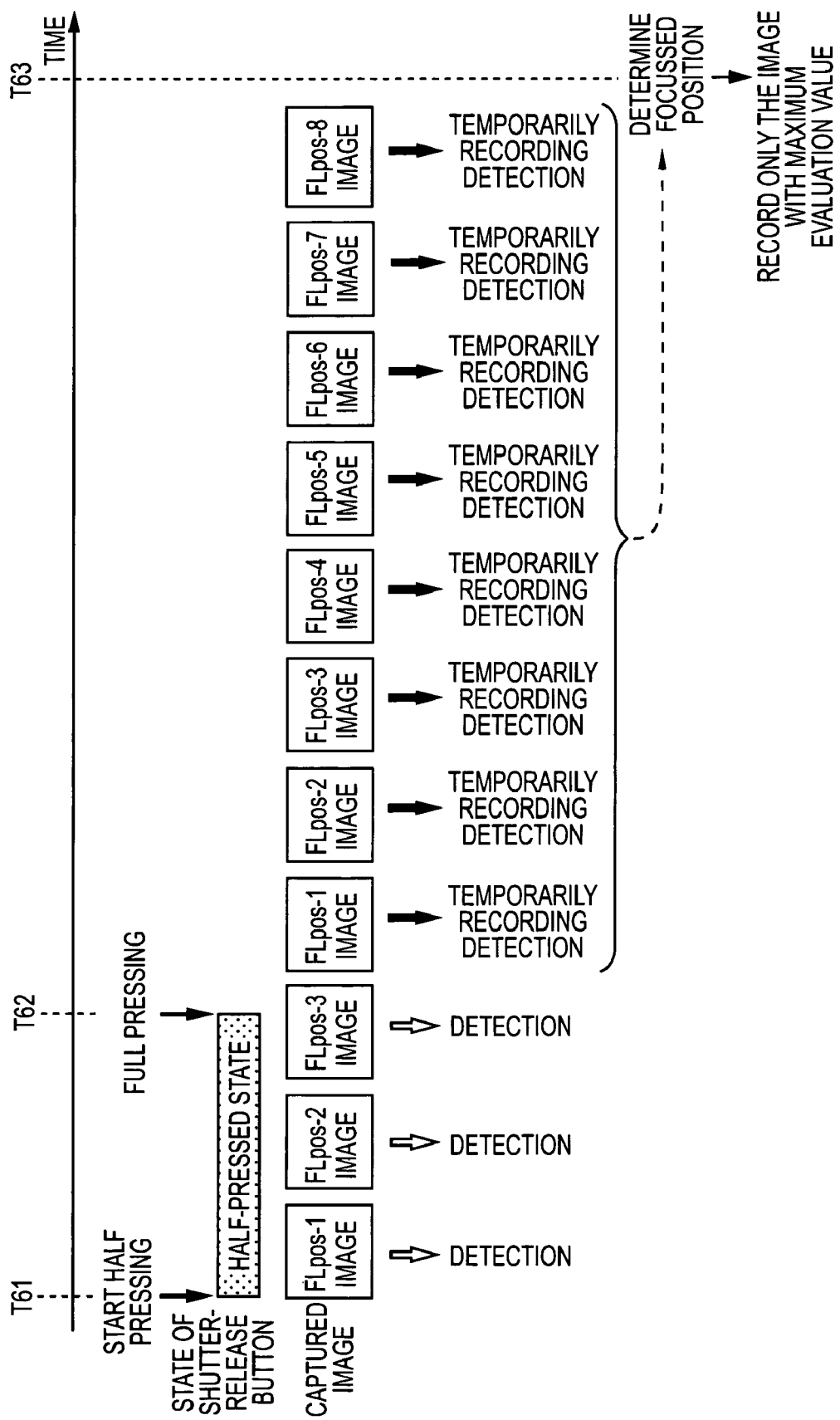

IMAGE PICKUP APPARATUS, METHOD OF CONTROLLING IMAGE PICKUP AND COMPUTER-READABLE STORAGE MEDIUM

CROSS REFERENCES TO RELATED APPLICATIONS

The present invention contains subject matter related to Japanese Patent Application JP 2004-229661 filed in the Japanese Patent Office on Aug. 5, 2004, the entire contents of which are incorporated herein by reference.

BACKGROUND OF THE INVENTION

1. Field of the Invention

The present invention relates to an image pickup apparatus for picking up images using a solid-state image pickup device. More particularly, the present invention relates to an image pickup apparatus including an auto-bracket function for continuously capturing a plurality of pickup images to which different image-pickup conditions are applied in sequence and an automatic adjustment function for automatically determining the optimum image-pickup condition to pickup an image, and to a method of controlling image pickup and a program.

2. Description of the Related Art

An image-pickup apparatus, such as a digital still camera picking up images using a solid-state image pickup device, etc., often has a function of automatically adjusting focus, brightness, hue, etc., appropriately at image-pickup time. For example, AF (Auto Focus), AE (Auto Exposure), AWB (Auto White Balance), etc., are typical automatic adjustment functions. Also, the apparatus is commonly equipped with a function of automatically going off electronic flash light only when an object of image-pickup is in the dark.

Some of known image-pickup apparatuses perform an operation of obtaining control values by the above-described automatic adjustment functions when a user half-presses the shutter-release button using a shutter-release button having two states, namely, a "half-pressing" and a "full-pressing". A half-pressing of a shutter-release button is called a "half-release", etc. In such an image-pickup apparatus, for example, the following procedure is performed for picking up images. In this regard, the AF function is taken for example here.

First, when the shutter-release button is half-pressed, the AF function is activated, the focus lens is moved with capturing pickup images continuously, and the evaluation values of a degree of focussing are obtained from the captured signals. The lens position with the largest evaluation value is the focused position. When that position is obtained and the focus lens is moved to that position, the completion of the automatic adjustment is notified by a screen display and a sound, etc. Thus, the user full-presses the shutter-release button to make it possible to record the pickup image in focus into a recording medium. In such an image-pickup apparatus, when the shutter-release button is full-pressed at once without going into a half-release state, the above-described automatic adjustment functions is not activated, the image-pickup signal is captured on the image-pickup condition at that time without change to record it into a recording medium. Alternatively, in some of the image-pickup apparatuses, even if full-pressed, a pickup image is not recorded into the recording medium until the optimum control value is obtained by the automatic adjustment function.

Here, if the automatic adjustment function is activated at half-release time as described above, there is a problem in that it takes some time until the optimum image-pickup condition is obtained, thereby losing chances of taking a picture. Also, there is a problem in that the control value determined to be the best by the image-pickup apparatus might be different from the user's intention because of the performance limit of the automatic adjustment. Accordingly, up to now, an increase in the speed of the automatic adjustment and an improvement in the adjustment performance are demanded.

In order to solve these problems, there has been an image-pickup apparatus having a function called "auto-bracket" which continuously records a plurality of images on different image-pickup conditions in a short time when a shutter-release button is pressed once. As a commonly-used auto-bracket function, a function for picking up images by changing the amount of exposure adjustment using an AE function is known. By such a function, a user can make his or her choice from a plurality of recorded images afterward, and thus it has been possible to obtain an image in accordance with the user's intention without losing chances of taking a picture. However, at the same time, there has been a drawback in that a recording medium is used wastefully. On the other hand, for example, there has been a digital camera (for example, refer to Japanese Unexamined Patent Application Publication No. 2004-135029 (paragraph numbers [0047] to [0065], FIG. 3)) in which focus-evaluation values are calculated for individual images picked up with changing the focus-lens positions by the auto-bracket function and the image with the highest value is automatically selected and recorded into a recording medium.

Also, in an image-pickup apparatus having an auto-bracket function, it is possible to change an image-pickup mode using the auto-bracket and a usual image-pickup mode which picks up an image one by one. Furthermore, it is thought that a plurality of kinds of adjustment values are changed when the auto-bracket function is activated and that the combination thereof is allowed to be set in accordance with a user's operation. By these functions, it becomes possible to pick up an image more suited to user's intention. However, the number of user operation steps increases that much. On the other hand, there has been an electronic still camera in which the auto-bracket function is automatically determined to be necessary or not based on the picked-up images, and if necessary, images are picked up using the auto-bracket function to record a plurality of images on different image-pickup conditions into a recording memory, thereby improving the operationality (for example, refer to Japanese Unexamined Patent Application Publication No. 2001-8087 (paragraph numbers [0020] to [0034], FIG. 1)).

As described above, as the technique disclosed in Japanese Unexamined Patent Application Publication No. 2004-135029, by automatically selecting the image with the optimum image-pickup conditions out of the pickup images by the auto-bracket function and recording it into a recording medium, it is possible to use the recording medium effectively, and to increase the possibility of obtaining the image preferable to the user without losing chances of taking a picture. Also, by finely adjusting the image-pickup conditions at auto-bracket time, it becomes easy to reflect the user's intention. As the technique disclosed in Japanese Unexamined Patent Application Publication No. 2001-8087, by automatically determining the necessity of the auto-bracket function, it is possible to further increase the operationality of the user.

However, the technique for automatically keeping images in a recording medium and the technique for automatically determining the necessity of the auto-bracket function are basically the same as an automatic adjustment technique at half-release time described above, and thus there remains a possibility of recording images which are not in accordance with the user's intention. The advantage of the auto-bracket function lies in the fact that the images preferable to the user can be selected by that user from a plurality of recorded images after picking up images. Thus, that advantage is sometimes lost if the above-described automatic selection and automatic determination are performed.

On the other hand, if the auto-bracket function is used, it is commonly necessary to change the operation modes by a key operation, etc. A large number of users pick up images in an operation mode in which an automatic adjustment function is activated at ordinary use time, and use the auto-bracket function by changing the operation mode if necessary. However, in such a way of use, the user often loses a chance of taking a picture while changing the operation modes. In spite of this, if the auto-bracket function is activated all the time, even in a case of obtaining an appropriate image by the automatic adjustment function, a lot of images are recorded, the capacity of the memory is used unnecessarily, and it takes time and effort to select necessary images. That is to say, in a known image-pickup apparatus, there has been a problem in that the operationality for a user of using the auto-bracket function at once when necessary has not been considered and the advantage of the auto-bracket function has not been utilized.

SUMMARY OF THE INVENTION

The present invention has been made in view of the problems described above. It is desirable to provide an image-pickup apparatus which is user-friendly and is capable of picking up high-quality images in accordance with a user's intention without losing chances of taking a picture.

It is also desirable to provide an image-pickup control method which is user-friendly and allows to pick up high-quality images in accordance with a user's intention without losing chances of taking picture.

It is furthermore desirable to provide an image-pickup-control program which is user-friendly and is capable of picking up high-quality images in accordance with a user's intention without losing chances of taking a picture.

According to an embodiment of the present invention, there is provided an image-pickup apparatus for picking up an image using a solid-state image pickup device, the apparatus including: a first and a second input receiving parts for receiving different input signals with each other in accordance with an input operation of a user; an image-pickup-condition determination part for determining an optimum image-pickup condition to be set at image-pickup time; and an image-pickup controller for controlling such that a determination operation by the image-pickup-condition determination part is started at the time of receiving an input signal by the first input receiving part, when the input signal is received continuously and the second input receiving part receives an input signal after the optimum image-pickup condition is determined by the determination operation, an image picked up by applying the image-pickup-condition determined to be the best is captured, and when the second input receiving part receives the input signal on the other conditions, a plurality of pickup images are captured continuously by applying different image-pickup conditions in sequence.

In such an image-pickup apparatus, when the first receiving part receives an input signal, a determination operation on the image-pickup condition is started by the image-pickup-condition determination part, and is continued while the input signal is received continuously. If the second input receiving part receives an input signal after the optimum image-pickup condition is determined by the determination operation, an image is captured by applying the image-pickup-condition determined the best. On the other hand, if the second input receiving part receives an input signal on the other conditions, for example, if the second input receiving part receives an input signal before the completion of the above-described determination operation, or the second input receiving part receives an input signal without the first input receiving part receiving the input signal, a plurality of pickup images are captured continuously by applying the different image-pickup conditions in sequence.

Also, using the shutter-release button for a user input operation, the second input receiving part may receive the input signal when a shutter-release button is full pressed, the first input receiving part may receive the input signal when the shutter-release button is pressed to a predetermined position shallower than at full-pressed time, and may continue to receive the input signal while the shutter-release button is kept being pressed at the predetermined position.

Also, according to another embodiment of the present invention, there is provided a method of controlling picking up an image for controlling an image-pickup operation using a solid-state image pickup device, the method including the steps of: an image-pickup-condition determination part starting a determination operation for determining an optimum image-pickup condition to be set at image-pickup time when a first input receiving part receives an input signal in accordance with an input operation of a user as a first step; an image-pickup-control part capturing an image picked up by applying the image-pickup-condition determined to be the best as a second step if the first input receiving part receives the input signal continuously from the first step and the second input receiving part receives an input signal different from that received by the first input receiving part in accordance with an input operation of the user after the optimum image-pickup condition is determined by the determination operation; and an image-pickup controller capturing a plurality of pickup images continuously by applying different image-pickup conditions in sequence as a third step if the second input receiving part receives an input signal on the condition different from that in the second step.

In such an image-pickup method, when the first receiving part receives an input signal in the first step, a determination operation on the image-pickup condition is started by the image-pickup-condition determination part, and is continued while the input signal is received continuously. If the second input receiving part receives an input signal after the optimum image-pickup condition is determined by the determination operation, an image is captured by applying the image-pickup-condition determined to be the best in the second step. On the other hand, in the third step, if the second input receiving part receives an input signal on the other conditions, for example, if the second input receiving part receives an input signal before the completion of the above-described determination operation, or the second input receiving part receives an input signal without the first input receiving part receiving the input signal, a plurality of pickup images are captured continuously by applying the different image-pickup conditions in sequence.

Also, using the shutter-release button for a user input operation, the second input receiving part may receive the input signal when a shutter-release button is full pressed, the first input receiving part may receive the input signal when the shutter-release button is pressed to a predetermined position shallower than at full-pressed time, and may continue to receive the input signal while the shutter-release button is kept being pressed to the predetermined position.

According to the present invention, for example, using a half-pressing and a full-pressing operations of the shutter-release button, by adjusting the timing to supply an input signal to the first and the second input-receiving parts in accordance with the input operation of a user, it is possible to switch an operation mode in which a pickup image to which the image-pickup-condition determined to be the best by an image-pickup-control part is applied is captured, and an operation mode in which a plurality of pickup images with different image-pickup conditions are all captured. Accordingly, if the user determines that a pickup image in accordance with the user's intention is difficult to be obtained in the former operation mode, it is possible for the user to perform image pickup in the latter operation mode all at once without changing the operation mode in order to capture a plurality of pickup images with different image-pickup conditions. Thus, it is possible to obtain pickup images with more suitable quality for the user without losing chances of picking up an image.

BRIEF DESCRIPTION OF THE DRAWINGS

FIG. 9 is a timing chart for explaining a general operation when a half-pressing state is a very short period of time in another embodiment.

DESCRIPTION OF THE PREFERRED EMBODIMENTS

In the following, a detailed description will be given of embodiments of the present invention with reference to the drawings.

Figure 1:
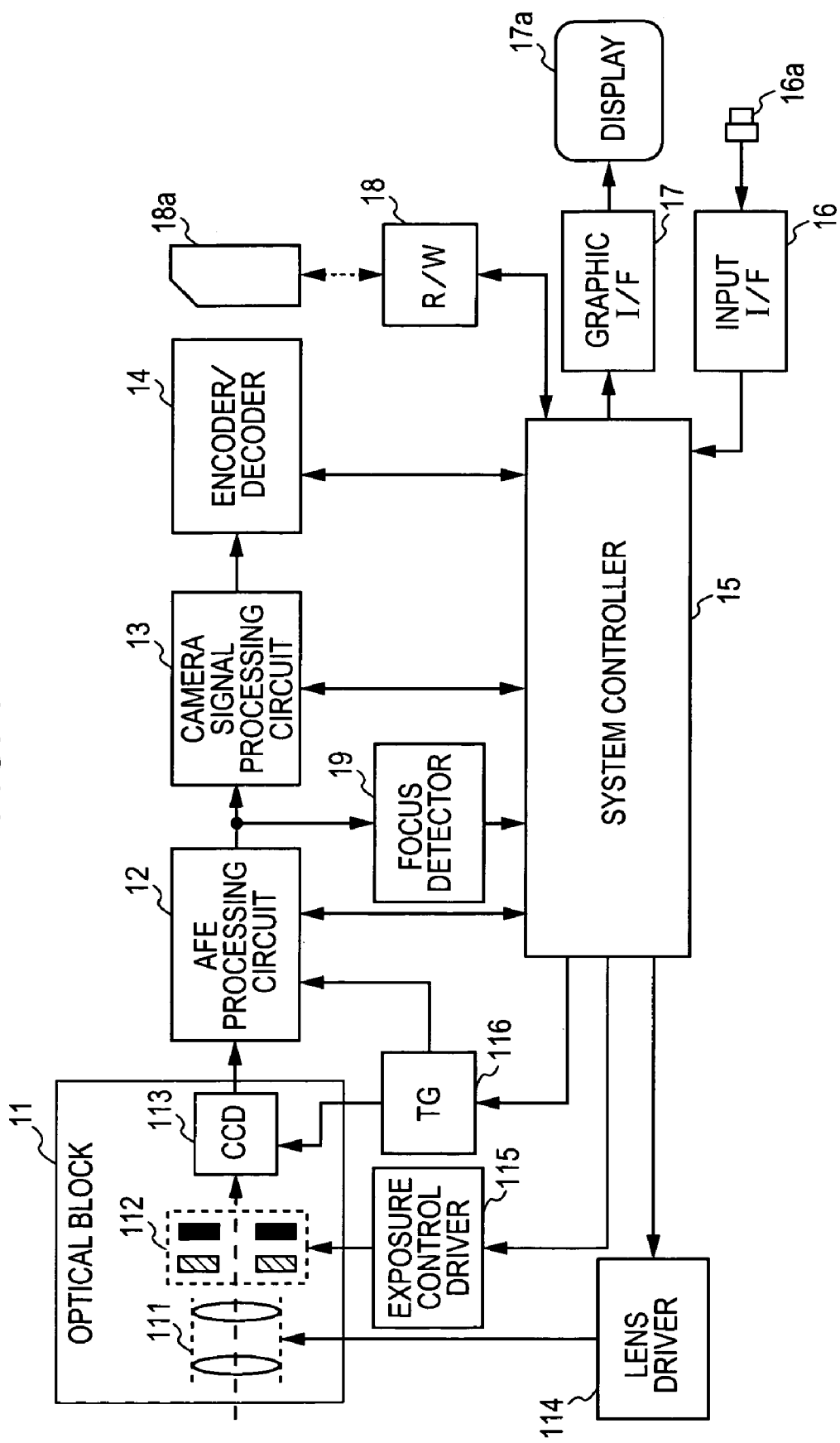
FIG. 1 is a block diagram illustrating the entire configuration of a digital still camera according to an embodiment of the present invention.

FIG. 1 is a block diagram illustrating the entire configuration of a digital still camera according to an embodiment.

The digital still camera shown in FIG. 1 includes an optical block 11, an analog front-end (AFE) processing circuit 12, a camera-signal processing circuit 13, an encoder/decoder 14, a system controller 15, an input I/F (interface) 16, a graphic I/F 17, a display 17a, and a R/W (reader/writer) 18. Also, a focus detector 19 is connected to the system controller 15.

The optical block 11 includes a lens mechanism 111 including a plurality of lenses and the movement mechanism thereof, an exposure mechanism 112 including an iris, a shutter, and the drive mechanism thereof, a CCD (charge-coupled device) 113 as a solid-state image pickup device. Also, a lens driver 114, an exposure-control driver 115, and a timing generator (TG) 116 are disposed for driving the lens mechanism 111, the exposure mechanism 112, and the CCD 113, respectively.

In the optical block 11, reflected light from an object passes through the optical system including the lens mechanism 111 and the exposure mechanism 112, and is received by the CCD 113 to be photoelectric transferred. In this regard, for a solid-state image pickup device, for example a CMOS (complementary metal-oxide semiconductor) image sensor, etc., may be used in place of the CCD.

Under the control of the system controller 15, the lens driver 114 and the exposure-control driver 115 control the operations of the lens mechanism 111 and the exposure mechanism 112, respectively. Under the control of the system controller 15, the TG 116 supplies a timing signal to the CCD 113 to control the driving timing thereof. Also, the timing signal is supplied to the AFE processing circuit 12.

The AFE processing circuit 12 performs sample holding on the analog image signal output from the CCD 113 such that a S/N (Signal/Noise) ratio is kept favorable by CDS (Correlated Double Sampling) processing. Furthermore, the AFE processing circuit 12 controls a gain by AGC (Auto Gain Control) processing, and performs A/D conversion to output a digital image signal. In this regard, the AFE processing circuit 12 operates in accordance with the timing signal from the TG 116, and the gain of the AGC processing is given from the system controller 15.

The camera-signal processing circuit 13 performs camera-signal processing such as white-balance adjustment processing, color-correction processing, AE processing, etc., on the image signal from the AFE processing circuit 12 under the control of the system controller 15.

The encoder/decoder 14 performs compression coding processing on the image signal from the camera-signal processing circuit 13 in a predetermined still-image data format such as a JPEG (Joint Photographic Coding Experts Group) method, etc. Also, the encoder/decoder 14 performs expansion/decoding processing on the coding data of the still image supplied from the controller 15.

The system controller 15 is a micro-controller including, for example a CPU, a ROM, a RAM, etc., and totally controls each part of the digital still camera by executing the program stored in the ROM, etc., in accordance with the control signal from the input I/F 16. Also, in the present embodiment, in particular, the system controller 15 gives a control signal to the lens driver 114 based on the focus-evaluation value from the focus detector 19 in order to execute the AF processing for moving the focus lens in the lens mechanism 111.

The input I/F 16 includes, various operation keys, levers, dials, etc., for example a shutter-release button 16a, etc., and outputs a control signal to the system controller 15 in accordance with the input operation of a user. In the present embodiment, in particular, the shutter-release button 16a notifies the system controller 15 of a half-pressed state and a full-pressed state individually.

The graphic I/F 17 generates an image signal to be displayed to the display 17a from the signal supplied from the system controller 15, and supplies this signal to the display 17a to display the image. The display 17a includes, for example an LCD (Liquid Crystal Display), etc., and displays a reproduction image, etc., based on the pickup image through the camera and the data recorded in a memory card 18a.

The memory card 18a including a portable flash memory is detachably connected to the R/W 18 as a recording medium for recording image data, etc., created by picking up an image. The R/W 18 writes the data supplied from the system controller 15 to the memory card 18a, and outputs the data read from the memory card 18a to the system controller 15. In this regard, in addition to this, for example a writable optical disc, an HDD (hard disk drive), etc., may be used as a recording medium.

The focus detector 19 calculates a focus-evaluation value for the AF processing based on the output signal from the AFE processing circuit 12 to supply it to the system controller 15. The focus detector 19 includes a high-pass filter (HPF) or a band-pass filter (BPF), etc., for detecting mainly high-frequency components of the input signal, and an integration circuit for integrating the detected high-frequency components for each screen to produce a focus-evaluation value.

Here, a description will be given of a basic operation of the digital still camera described above at image-pickup time. First, a description will be given of the operation at the time of picking up a still image.

Before picking up a still image, the signal produced by the photoelectric transfer of the CCD 113 by receiving light is supplied to the AFE processing circuit 12 in sequence. The AFE processing circuit 12 performs the CDS processing and the AGC processing on the input signal, and further converts the signal into the digital signal. The camera-signal processing circuit 13 performs image-quality correction processing on the digital signal supplied from the AFE processing circuit 12, and supplies it as a camera-through-image signal to the graphic I/F 17 through the system controller 15. Thus, the camera-through image is displayed to the display 17a, and it becomes possible for a user to adjust angular field of view by viewing the display 17a.

In this state, if the shutter-release button 16a of the input I/F 16 is pressed, the system controller 15 outputs control signals to the exposure-control driver 115, and the TG 116 to operate the shutter. Thereby, the CCD 113 outputs an image signal for one frame. In this regard, the system controller 15 outputs control signals to the lens driver 114, the exposure-control driver 115, and the TG 116 in accordance with the focus-evaluation value from the focus detector 19, the result of the AE processing, etc., in the camera-signal processing circuit 13 at this time. Thus, the control is performed to appropriately set a focused state, an exposure time, and the amount of exposure.

The camera-signal processing circuit 13 performs image-quality correction processing on the image signal for one frame, which has been supplied from the CCD 13 through the AFE processing circuit 12, td supply it to the encoder/decoder 14. The encoder/decoder 14 performs compression coding on the input image signal, and supplies the generated coded data to the R/W 18 through the system controller 15. Thereby, the data file of the picked-up still image is stored in the memory card 18a.

On the other hand, when reproducing the still-image file stored in the memory card 18a, the system controller 15 reads the still-image file selected from the memory card 18a through the R/W 18 in accordance with the operation input from the input I/F 16, and supplies it to the encoder/decoder 14 to perform the expansion/decoding processing. The decoded image signal is supplied to the graphic I/F 17 through the system controller 15, thereby the still image is reproduced and displayed to the display 17a.

Incidentally, this digital camera has an automatic adjustment function, such as the above-described AE processing, AF processing, AWB processing, etc., for automatically determining the optimum control values of the image-pickup condition and capturing the pickup image to which those values are applied, and an auto-bracket function for continuously capturing a plurality of pickup images by changing the control values of the image-pickup condition. So far, in a known digital still camera having each of these functions, each function is switched for use by switching the operation modes. In contrast, in the present embodiment, as described below, a "automatic switching mode", in which the auto-bracket function can be operated immediately in accordance with the timing of a half-pressing and full-pressing of the shutter-release button 16a even if the automatic adjustment function is in operation, is provided. This operation mode makes it possible to increase the operationality of a user and to pick up high-quality images in accordance with a user's intention with a high probability.

Figure 2:
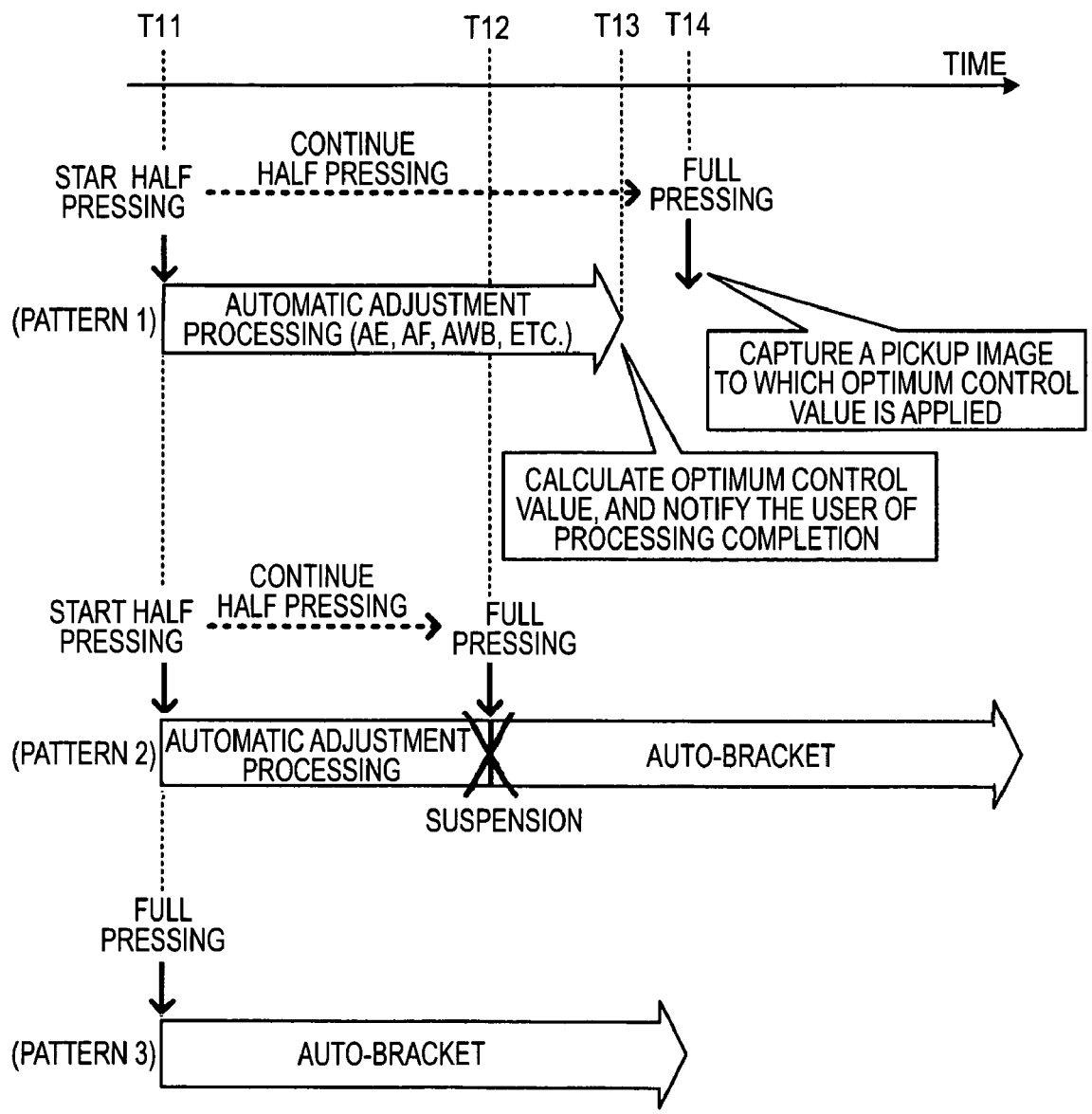
FIG. 2 is a schematic diagram illustrating the operation of a camera in response to input operations in an automatic switching mode.

FIG. 2 is a schematic diagram illustrating the operation of a camera in response to input operations in an automatic switching mode.

FIG. 2 is an explanatory diagram illustrating the operations in a digital still camera, assuming that three typical patterns of input operations are performed using the shutter-release button 16a. As shown in patterns 1 and 2, when a half-pressing of the shutter-release button 16a is started, (timing T11), automatic adjustment processing, such as the AE processing, the AF processing, etc., are started. Also, while the half-pressing continues without change, the automatic adjustment processing is continued.

For example, in the AE processing and the AWB processing, pickup images for one frame (or one field) are captured. The signal components of the captured pickup images are analyzed by the processing in the camera-signal processing circuit 13 and the system controller 15 to calculate the optimum control values, such as the aperture of the iris of the exposure mechanism 112, the shutter speed of the optical shutter, the exposure time by the CCD 113, the gain by the AGC in the AFE processing circuit 12, the amount of correction of the signal components in the camera-signal processing circuit 13. Also, in the adjustment processing of the amount of electronic flash light, the similar optimum control value is calculated based on the pickup images captured by performing preliminary emission of flash light. Furthermore, in the AF processing, as described below, the position of the focus lens is changed in stages and the pickup images is captured at each stage to be detected by the focus detector 19 in order to determine the optimum lens position. In this manner, the automatic adjustment processing needs a certain period of time. In FIG. 2, the timing from T11 to T13 corresponds to that time period.

Here, as shown by the pattern 1, when the shutter-release button 16a is full-pressed (timing T14) after sufficient time elapses for the automatic adjustment processing calculating the optimum control values from the start of the half-pressed state, an image is picked up by applying the optimum values and the pickup image is captured and recorded into the memory card 18a. For example, when the optimum values are calculated, the user may be notified of the completion of the calculation processing by the display and the audio output. In this case, the user can perform full-pressing on the shutter-release button 16a after confirming the completion of the calculation of the optimum control values, and thus it is possible to explicitly execute the image-pickup operation with activating the automatic adjustment function.

Also, the operations of the case where the full-pressing of the shutter-release button 16a is performed on the conditions other than the ones described above are the patterns 2 and 3. In the pattern 2, the shutter-release button 16a is full-pressed (timing T12) before the optimum control values are calculated by the automatic adjustment function after the start of the half-pressed state beginning at timing T11. In this case, the digital still camera suspends the automatic adjustment processing and operates the auto-bracket function, and thus the control values of the image-pickup conditions are changed in sequence, and the image picked up at each time is recorded in the memory card 18a.

Also, the pattern 3 shows the case where the shutter-release button 16a is full-pressed at once at timing T11 without half-pressing the shutter-release button 16a. In this case, the auto-bracket function is activated at once to start recording a plurality of pickup images with different image-pickup conditions into the memory card 18a.

By the operations of the patterns 2 and 3, if the user determines that there is little possibility of picking up images to meet user's intention by the automatic adjustment function, it is possible to immediately execute the auto-bracket image pickup only by full-pressing the shutter-release button 16a without performing the input operation for switching the operation modes as is done so far. Accordingly, it becomes possible for the user to obtain pickup images with appropriate image qualities in accordance with a user's intention with a high probability by using the auto-bracket function in a positive manner, and thus there is no possibility of losing chances of taking a picture. Also, the auto-bracket function is activated only when necessary, and thus the capacity of the recording medium necessary for recording is reduced.

Next, a specific description will be given of the image-pickup operation using such an automatic switching mode. In the following description, an example will be given of the case where a so-called focus bracket, in which the control value of a focus-lens position is applied as an adjustment value to be changed at auto-bracket time, is performed.

Figure 3:
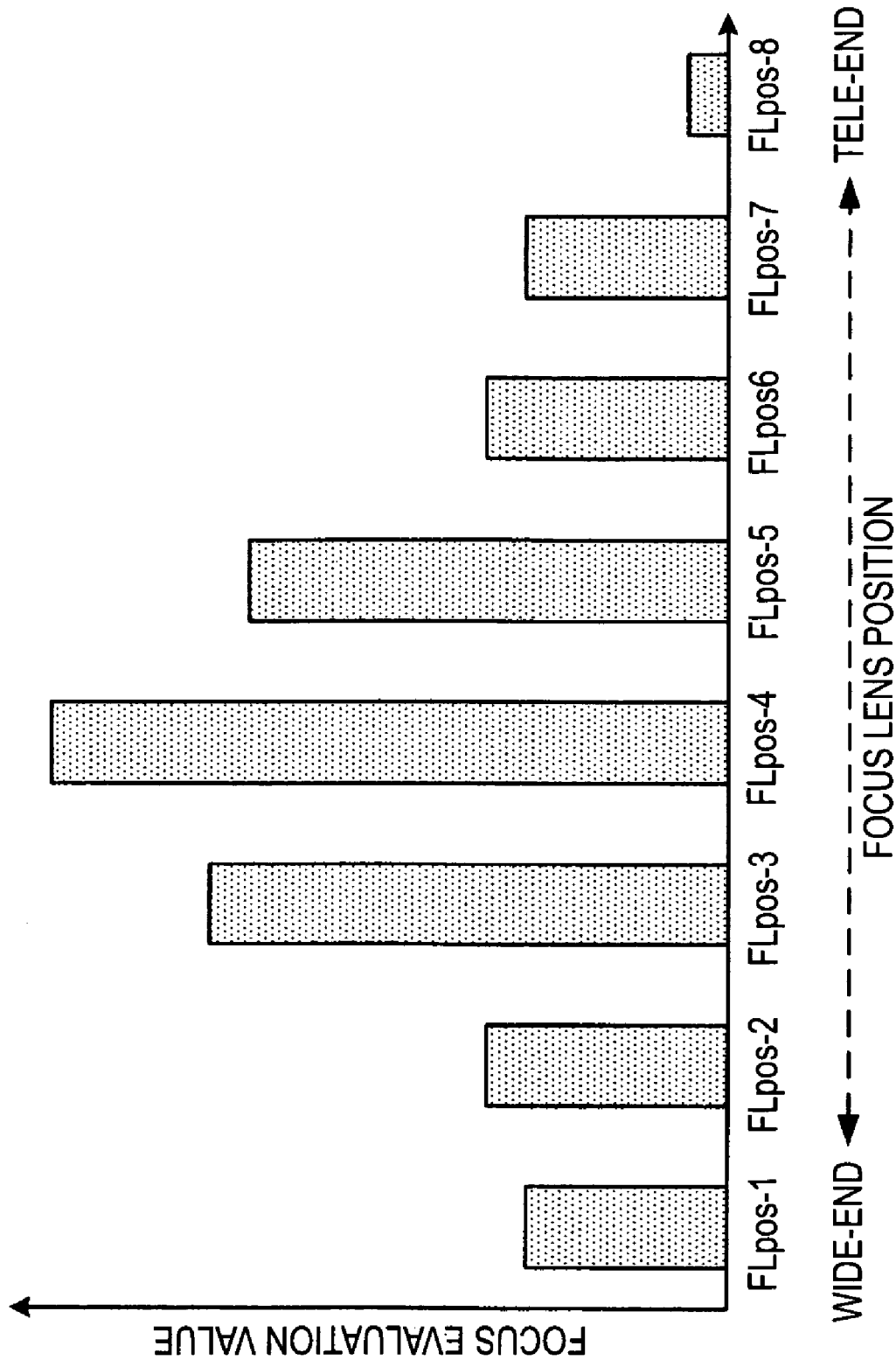
FIG. 3 is a graph for explaining a focus-evaluation value detected at AF processing time.

First, a description will be given of the basic operation at the time of the AF processing. FIG. 3 is a graph for explaining a focus-evaluation value detected at AF processing time.

For example, when the AF processing is performed in accordance with the half-pressing of the shutter-release button 16a, etc., the focus lens of the lens mechanism 111 is moved to a plurality of positions to capture the pickup image at each of the positions, and the images are input into the focus detector 19 by the control of the system controller 15. The focus detector 19 calculates a focus-evaluation value from each image to output it to the system controller 15.

In the example in FIG. 3, it is assumed that sufficient detection precision of the focused position of the focus lens is obtained by dividing the interval between the wide-end and the tele-end into 8 stages, namely, FLpos-1 to FLpos-8. The example graph shows focus-evaluation values calculated by the focus detector 19 at individual stages. In this example, the focus-evaluation value calculated at FLpos-4 has the highest evaluation value. The system controller 15 determines that FLpos-4 is the focused position from these focus-evaluation values, moves the focus lens to that position, and picks up an image once again to record it into the memory card 18a.

In this regard, at AF processing time, the calculation of the focus-evaluation values may not be performed in the entire area from the wide-end and the tele-end as is done in this example. For example, the calculation of the focus-evaluation values may be performed only in part of the area with the focus-lens position obtained by the AF processing immediately before as center.

Also, when the shutter-release button 16a is full-pressed, the pickup images in all the stages of FLpos-1 to FLpos-8 described above are all recorded into the memory card 18a. Thus, it is possible for the user to check these images recorded in the memory card 18a afterward by displaying or printing them in order to select the image in accordance with the user's intention. Alternatively, after the shutter-release button 16a is pressed, the pickup images in all the stages may be temporarily recorded in an unillustrated buffer memory in the apparatus, the images thereof may be displayed to the display 17a for the checking of the user, and only necessary images may be recorded into the memory card 18a by the user's operation.

In the present embodiment, as described below, it is possible to change the AF function and the focus-bracket function by the automatic switching mode in accordance with the timing of the half pressing and the full pressing of the shutter-release button.

Figure 4:
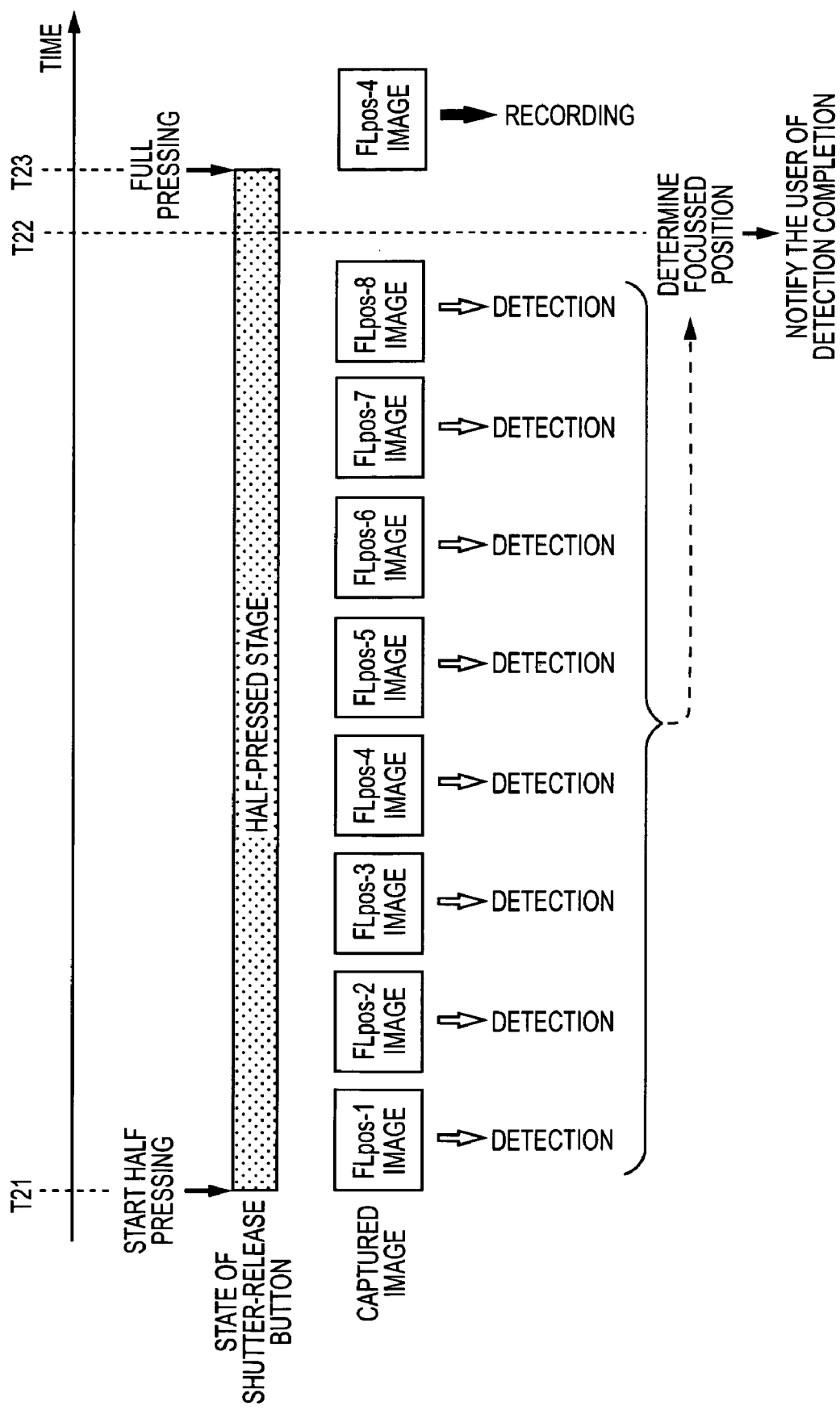
FIG. 4 is a timing chart for explaining a general operation when a focus-bracket function is controlled not to be activated.

FIG. 4 is a timing chart for explaining a general operation when a focus-bracket function is controlled not to be activated.

In FIG. 4, when the shutter-release button 16a is half-pressed at timing T21, and that state continues, the system controller 15 moves the focus lens from FLpos-1 in sequence, captures a pickup image at each stage to supply it to the focus detector 19, and obtains each focus-evaluation value. When the detection at all the positions FLpos-1 to FLpos-8 has been completed, the system controller 15 determines that the position with the highest focus-evaluation value is the focused position among all the positions, and moves the focus lens to that position. At the same time, the system controller 15 notifies the user of the completion of the detection operation of the focused position, for example by displaying an icon to the display 17a, making some sound, and so on (timing T22).

After that, when the user full-presses the shutter-release button 16a at timing T23 without releasing the half-pressed state of the shutter-release button 16a, the system controller 15 processes the image picked up at the focused position (FLpos-4 in the present embodiment) of the focus lens by the camera-signal processing circuit 13 and the encoder/decoder 14, and then records the image into the memory card 18a through the R/W 18.

In this manner, when the shutter-release button 16a is full-pressed after the half-pressing state continues for more than a time period necessary for the AF processing obtaining an appropriate lens position, only the image picked up using the control values based on the AF processing is recorded into the memory card 18a. It is possible for the user to operate the shutter after checking that the detection has been completed at timing T22 described above, when the detection is complete.

Figure 5:
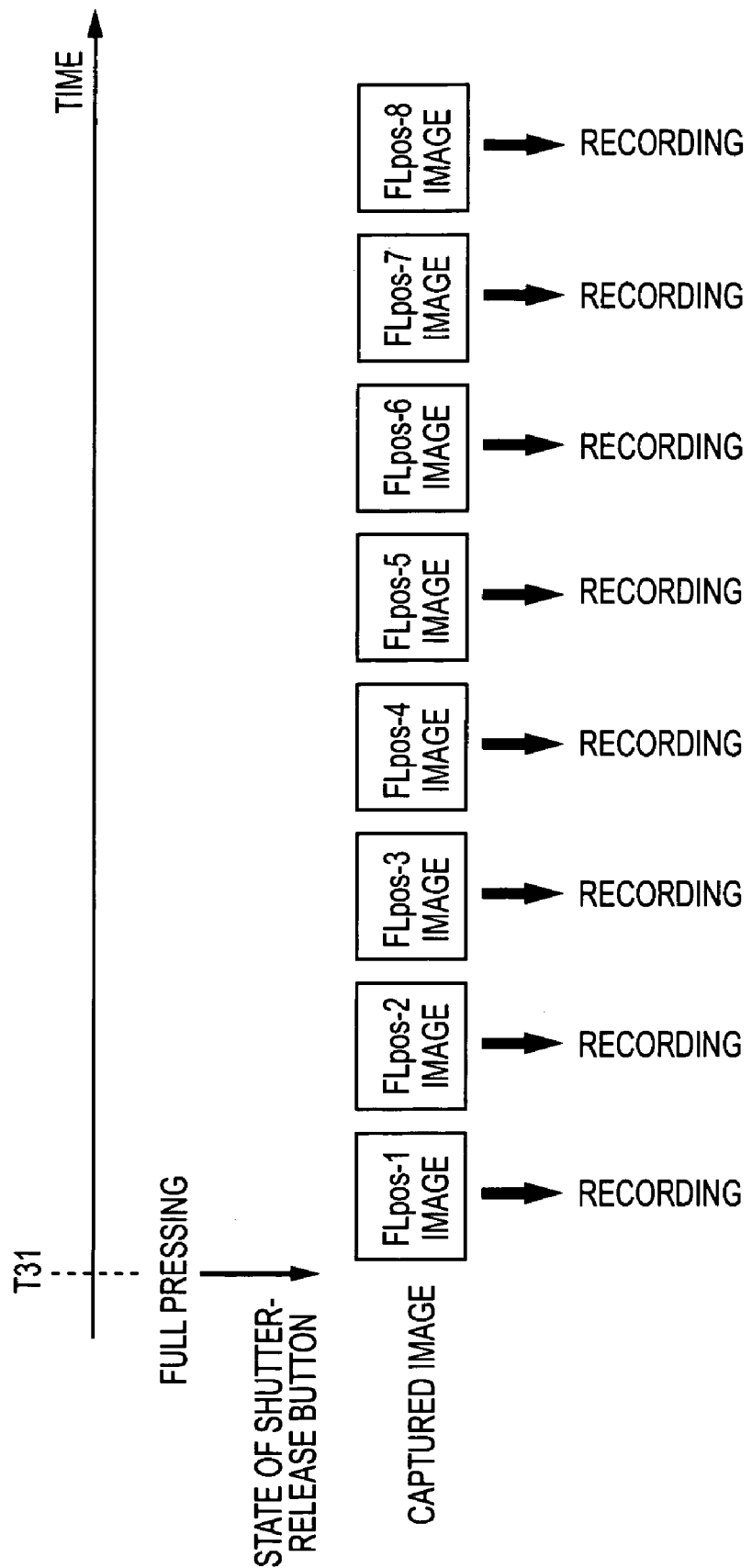
FIG. 5 is a timing chart for explaining a general operation when full pressing is performed without performing half pressing.

FIG. 5 is a timing chart for explaining a general operation when full pressing is performed without performing half pressing.

In the example in FIG. 5, the shutter-release button 16a is full-pressed at timing T31 all at once. At this time, the images picked up at all the lens positions FLpos-1 to FLpos-8 are similarly captured in sequence by the control of the system controller 15, and all of the images are recorded into the memory card 18a.

Figure 6:
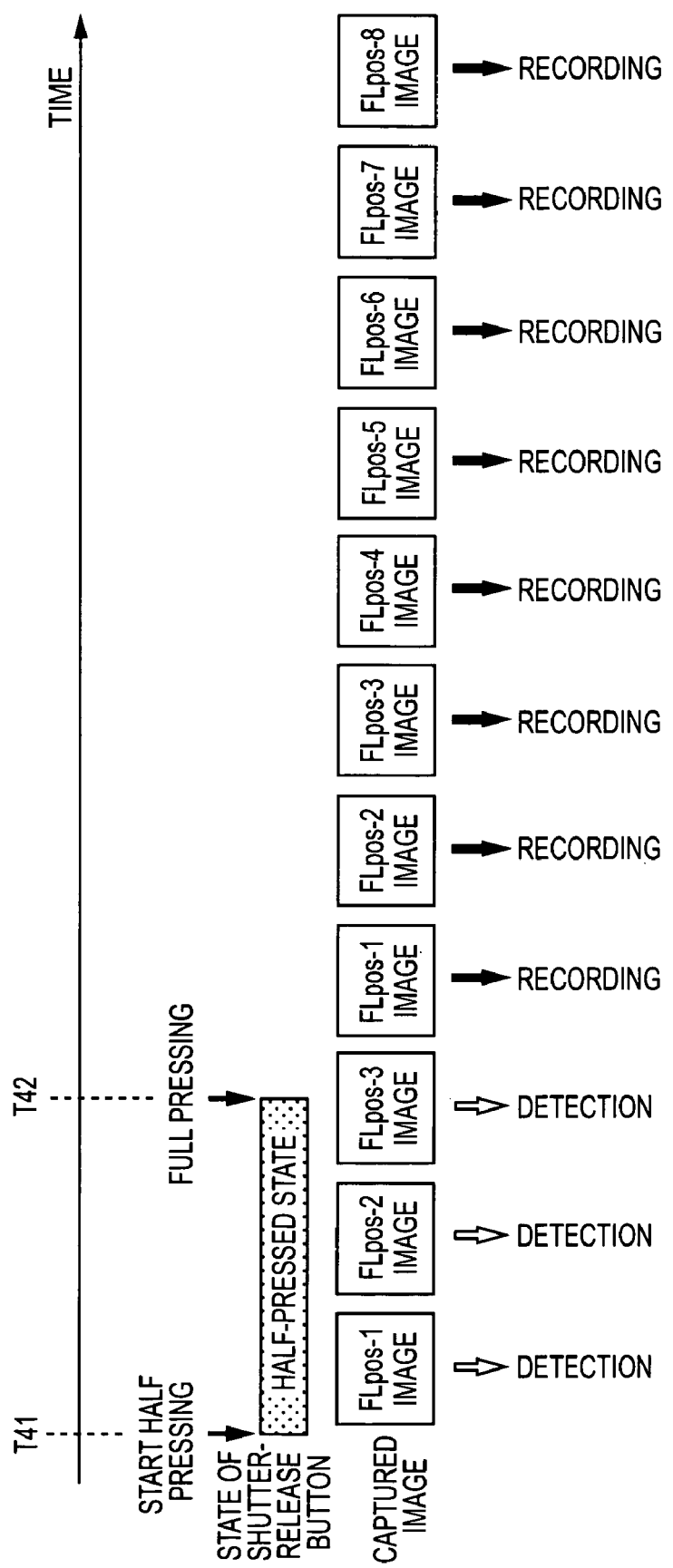
FIG. 6 is a timing chart for explaining a general operation when a half-pressing state is a very short period of time.

FIG. 6 is a timing chart for explaining a general operation when a half-pressing state is a very short period of time.

In the example in FIG. 6, if the shutter-release button 16a is half-pressed at timing T41 and this state continues, focus-evaluation values when the lens position is moved from FLpos-1 in sequence are calculated by the control of the system controller 15, and are supplied to the system controller 15. Here, if the shutter-release button 16a is full-pressed at timing T42 when the detection operation based on the detection at all the lens positions has not been completed, the system controller 15 returns the lens position to FLpos-1 again, and records the pickup images for all the lens positions (FLpos-1 to FLpos-8) into the memory card 18*a*.

In this manner, in the present embodiment, if the shutter-release button 16*a* is full-pressed before the AF processing detecting the optimum lens position and notifying the user of the completion while the half-pressing state of the shutter-release button 16 continues, only the image picked up at the detected lens position is recorded into the memory card 18*a*. On the other conditions, the focus-bracket function is activated automatically, and the images picked up at all the lens positions are recorded into the memory card 18*a*.

Figure 7:
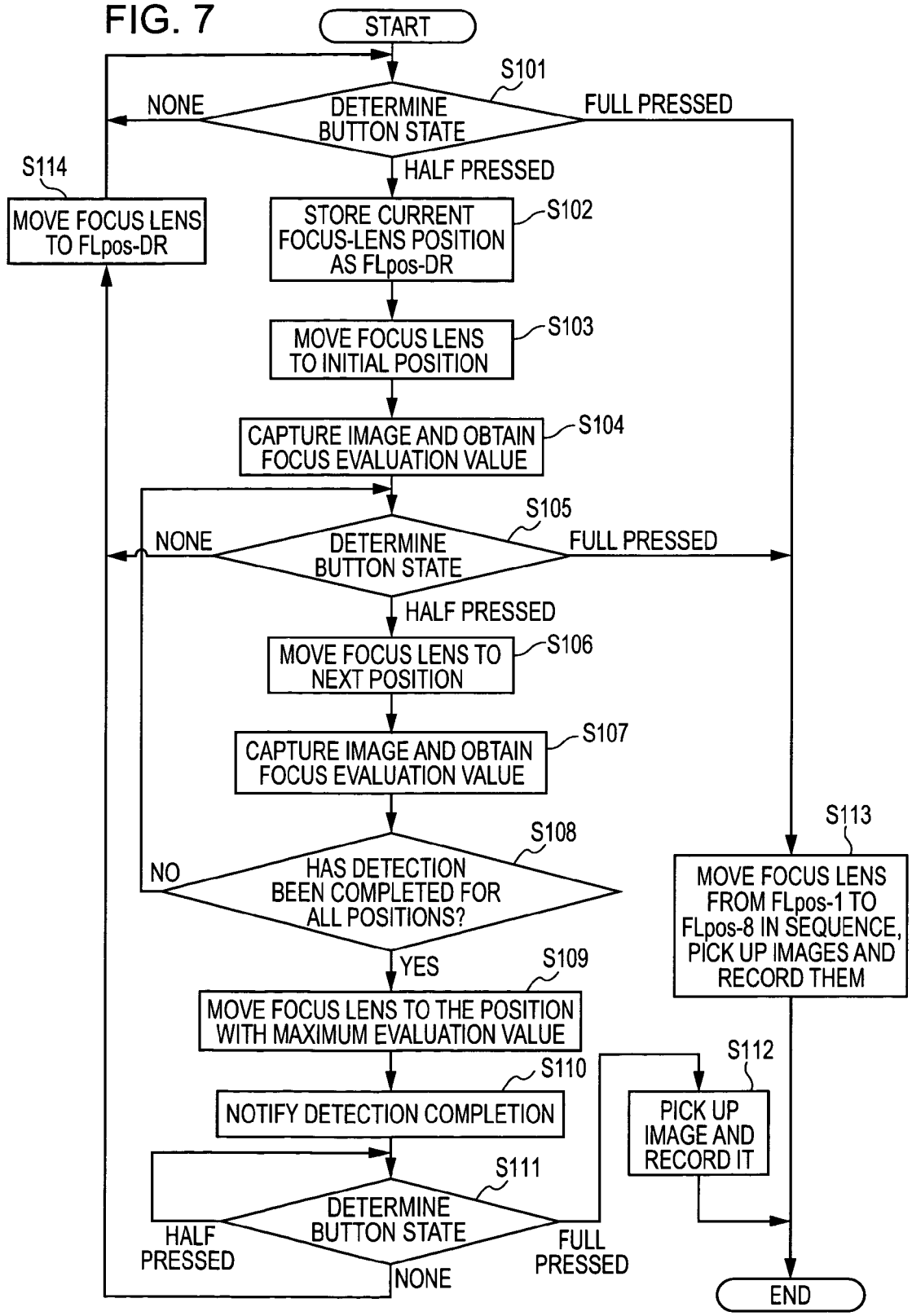
FIG. 7 is a flowchart illustrating the processing of a system controller when image-pickup is performed in an automatic switching mode.

FIG. 7 is a flowchart illustrating the processing of a system controller 15 when image-pickup is performed in an automatic switching mode.

(Step S101) Determine the pressing state of the shutter-release button 16*a*. If half-pressed, the processing proceeds to step S102. If full-pressed, the processing proceeds to step S113. Also, if not pressed, the determination of a pressing state is repeated at regular time intervals thereafter.

(Step S102) Store the current focus-lens position temporarily as FLpos-DR based on the control value for the lens driver 114.

(Step S103) Control the lens driver 114 to move the focus lens to the initial position (FLpos-1).

(Step S104) Take the pickup image into the focus detector 19, calculate the focus-evaluation value, and obtain the value.

(Step S105) Determine the pressing state of the shutter-release button 16*a*. If the half-pressed state continues, the processing proceeds to step S106. If full-pressed, the processing proceeds to step S113. Also, if returned to the original position, the processing proceeds to step S114.

(Step S106) Control the lens driver 114 to move the focus lens to the position next to the specified one.

(Step S107) Take the pickup image into the focus detector 19, calculate the focus-evaluation value, and obtain the value.

(Step S108) Move the focus lens to all the specified positions and determine whether the detection has been done. If the detection has been completed for all the positions, the processing proceeds to step S109. If not completed, the processing returns to step S105, and a determination is made on the pressing state of the shutter-release button 16*a* once again.

In the above steps S103 to S108, while the shutter-release button 16*a* is half-pressed, the focus lens is moved to all the positions FLpos-1 to FLpos-8, the image is picked up at each position, and the focus-evaluation value is calculated.

(Step S109) Select the maximum value from the focus-evaluation values for all the focus-lens positions, and move the focus lens to the corresponding lens position.

(Step S110) Display the icon indicating the completion of the detection on the display 17*a*. Thus, the user is notified of the completion of the detection.

(Step S111) Determine the pressing state of the shutter-release button 16*a*. If the half-pressed state continues, the determination of a pressing state is repeated at regular time intervals thereafter. If full-pressed, the processing proceeds to step S112. Also, if returned to the original position, the processing proceeds to step S114.

(Step S112) Pick up the image in the focus-lens-position state by the processing in step S109. Record the image data, which was subjected to the camera-signal processing and the encoding processing, into the memory card 18*a*. Thereby, the pickup image at the optimum focus-lens position determined by the AF processing is recorded.

(Step S113) If the shutter-release button 16*a* is full-pressed in steps S101 and S105, the focus-bracket function is activated. That is to say, the focus lens is moved to all the positions (FLpos-1 to FLpos-8) in sequence, and the image is picked up at each position. Each pickup image is subjected to the camera-signal processing and the encoding processing, and the image data after the processing is recorded into the memory card 18*a*. Thus, the pickup image at each focus-lens position is all recorded.

(Step S114) If the shutter-release button 16*a* is returned to the original position from the half-pressed state, the focus lens is moved to the position stored in step S102 (FLpos-DR). That is to say, if the shutter-release button 16*a* is returned before the calculation of the focus-evaluation values at all the lens positions FLpos-1 to FLpos-8 is complete, the focus lens is returned to the position immediately before starting the half-pressing of the focus lens. The processing returns to step S101, and monitors the pressing state of the shutter-release button 16*a* thereafter.

In this regard, in the processing described above, image pickup is performed at the same focus-lens positions both at AF processing time and at focus-bracket-function activated time. However, the range of the movement of the focus lens may be limited by reducing the number of the focus-lens positions in step S113 in order to reduce the number of images to be recorded for saving the memory capacity at focus-bracket time.

In the above embodiment, if full-pressed before the AF processing detecting the optimum lens position to notify a user of the completion, or if full-pressed without going through the half-pressed state, the focus-bracket function is automatically activated, the pickup images at all the lens positions are recorded into the memory card 18*a*. Thus, it becomes possible for a user to capture images in accordance with the user's intention by a simpler operation than before.

For example, if the shutter-release button 16*a* is full-pressed before the AF processing has been completed, the user is assumed to be in a hurry to operate the shutter in order not to lose a chance of taking a picture. Accordingly, the AF processing is suspended, and the picked-up images are recorded into the memory card 18*a* immediately. Furthermore, the images picked up at a plurality of lens positions are recorded by the focus-bracket function in order to allow the user to select the optimum one thereafter. This makes it possible to pick up a high-quality image without losing chances of taking a picture.

Also, it is possible to explicitly activate the focus-bracket function without operating to change the operation mode by full-pressing all at once when, for example, the user determines that there is little possibility of obtaining an appropriate image by the AF processing. Also, even in a state in which the AF processing is complete and the focus-lens position is automatically adjusted (a focus-lock state), it is possible to activate the focus-bracket function by returning the shutter-release button 16*a* and full-pressing it all at once. Accordingly, it is possible to use the focus-bracket function more positively because of the high operationality, and thus it becomes possible to pick up a more appropriate image in accordance with the user's intention.

Another Embodiment

Incidentally, in the above-described embodiment, all the pickup images at automatic focused positions are recorded into the memory card 18*a* at focus-bracket-function activation time. However, it is possible to calculate the focus-evaluation values of these picked-up images temporarily recorded, and then to keep only the image with the highest value.

In the following, a description will be given of the operation of this case. The same operation as that in FIG. 4 is performed if the half-pressing of the shutter-release button 16a is started, the maximum focus-evaluation value is calculated, and then the shutter-release button 16a is full-pressed.

Figure 8:
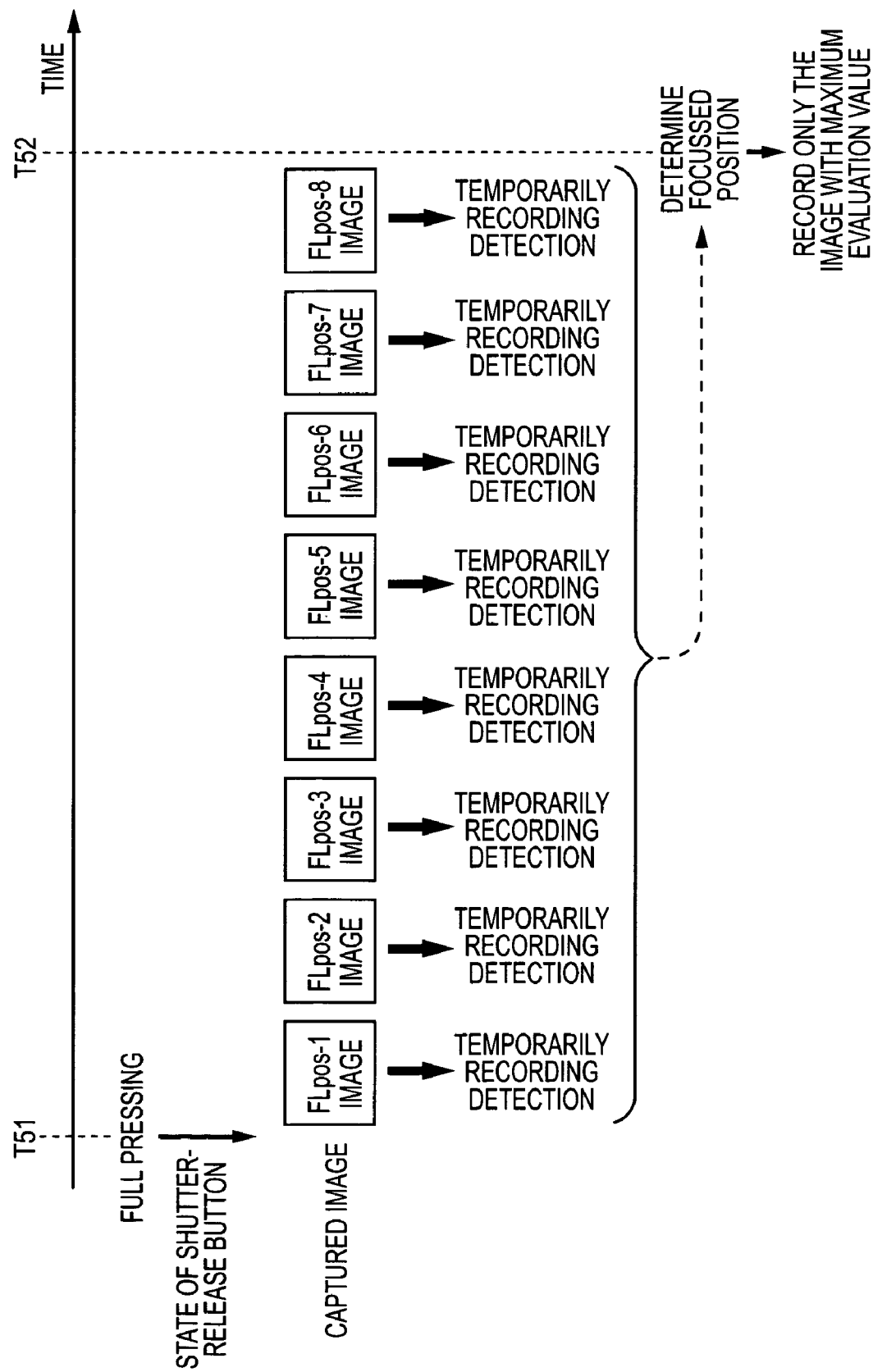
FIG. 8 is a timing chart for explaining a general operation when a full pressing is performed without performing a half pressing in another embodiment.

FIG. 8 is a timing chart for explaining a general operation when a full-pressing is performed without performing a half-pressing in the present embodiment.

In the example in FIG. 8, the shutter-release button 16a is full-pressed at once at timing T51 without going through the half-pressing state of the shutter-release button 16a. At this time, the images picked up at all the lens positions FLpos-1 to FLpos-8 are captured in sequence by the control of the system controller 15, and all of the images are temporarily recorded into an unillustrated buffer memory or the memory card 18a. Also, each of the images is supplied to the focus detector 19 to calculate a focus-evaluation value at each stage. The system controller 15 extracts the maximum value from the calculated focus-evaluation values, and records only the image corresponding to the maximum value in the memory card 18a to keep it out of the images temporarily recorded.

FIG. 9 is a timing chart for explaining a general operation when a half-pressing state is a very short period of time in the present embodiment.

In the example in FIG. 9, when the shutter-release button 16a is half-pressed at timing T61, and that state continues, the focus-evaluation values at the time of moving the lens positions from FLpos-1 in sequence are calculated. Here, if the shutter-release button 16a is full-pressed at timing T62 when the detection operation based on the detection at all the lens positions has not been completed, the focus lens is returned to the position FLpos-1 again, and the image pickup is performed for all the lens positions (FLpos-1 to FLpos-8). Each of the pickup signals is temporarily recorded into an unillustrated buffer memory or the memory card 18a and is supplied to the focus detector 19 to calculate the focus-evaluation value. Only the pickup image with the maximum focus-evaluation value is recorded and kept in the memory card 18a.

In this regard, in the operations of both in FIGS. 8 and 9, after the full-pressing of the shutter-release button 16a, all the pickup images at FLpos-1 to FLpos-8 may be temporarily recorded into the memory card 18a, and then each pickup image may be read from the memory card 18a to be detected by the focus detector 19 in order to obtain the maximum focus-evaluation value. Alternatively, the temporary recording of each pickup image into the memory card 18a or the buffer memory at FLpos-1 to FLpos-8 and the detection of the focus detector 19 may be performed in parallel.

In the above embodiments, if full-pressed before the completion of the detection of the optimum position by the AF processing, or if full-pressed without going through the half-pressing state, it is possible to record only the pickup image at the position determined to be the best by the AF processing into the memory card 18a. Also, in the AF processing after a half-pressing, it takes a certain time until the completion of the detection, and thus pickup images are not allowed to be recorded during that time period. However, in the present embodiment, if full-pressed during the AF processing, the recording of the pickup images is started from that point in time, and thus the user will not lose chances of taking a picture. At the same time, it is possible to reduce the number of records into the recording medium, and to use the recording area effectively.

Furthermore, in FIGS. 8 and 9 described above, a few pieces of the pickup images having large focus-evaluation values in the order of decreasing value may be remained in the memory card 18a among the pickup images after full-pressing. Accordingly, even if the lens position that is detected to be the best by the AF processing is different from the actual focused position, it is possible to remain the pickup images at the lens positions near that position, and thus higher-quality images can be obtained.

In this regard, in each embodiment, the timing of the half-pressing and the full-pressing of the shutter-release button 16a is used in order to change the AF function and the auto-bracket function. However, the other methods may be considered. For example, the half-pressing function of the shutter-release button 16a is achieved by another independent button. Here, this additional button is called an automatic-adjustment activation button. This automatic-adjustment activation button is disposed such that the button can be pressed by another finger in a state of putting a finger on the shutter-release button 16a.

Here, in each embodiment described above, assuming that the control signals received by the system controller 15 at the half-pressing and the full-pressing are a first control signal and a second control signal, respectively, the first control signal is generated by the pressing of the automatic-adjustment activation button in place of the half-pressing operation. This makes it possible for the user to pick up the image determined to be the best by the automatic adjustment function by pressing (full-pressing) the shutter-release button 16a after pressing the automatic-adjustment activation button for a sufficiently long time. Also, it is possible to activate auto-bracket function if the shutter-release button 16a is pressed in a short time after the automatic-adjustment activation button is pressed and if only the shutter-release button 16a is pressed.

In this regard, in each embodiment described above, a description has been given of the case where the present invention is applied to a digital still camera. However, the present invention can be additionally applied to, for example an image-pickup apparatus such as a digital video camera having a function of picking up a still image, a cellphone, a PDA (Personal Digital Assistant), etc.

Also, the present invention can be applied to an information-processing apparatus such as a personal computer which is connected to an external image-pickup device and is capable of capturing pickup images by controlling the image-pickup operations using that image-pickup device. In that case, a program, which is coded on the processing contents of the functions included in the digital still camera described above, is provided. Thus, the above-described processing functions are achieved on a computer by executing that program. The program coded on the processing contents can be recorded in a computer-readable recording medium. As a computer-readable recording medium, there are a magnetic recording apparatus, an optical disc, a magneto-optical disc medium, a semiconductor memory, etc.

In the case of distributing the program, for example a portable recording medium such as an optical disc will be marketed. Also, it is possible to store the program into a storage apparatus of a server computer, and to transfer the program from the server to another computer.

The computer for executing the program stores the program recorded in a portable recording medium or the program transferred from the server computer. The computer reads the program from the storage apparatus of itself and performs the processing in accordance with the program. In this regard, the computer can perform the processing in accordance with the program by directly reading the program from the portable recording medium. Also, the computer can receive the program from the server computer one part after another in sequence, and perform the processing in accordance with the received part of the program.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus for picking up an image using a solid state image pickup device, the apparatus comprising:
a first input part for receiving a first type of input from a user;
a second input part for receiving a second type of input from the user;
a recording device for recording to a memory;
an image pickup detector for determining an optimum lens focus position for picking up the image using a plurality of different lens focus positions, by moving a focus lens to the plurality of different lens focus positions and picking up the image at each of the plurality of different lens focus positions; and
an image-pickup controller for:
in response to receiving the first type of input from the user, initiating the picking up the plurality of images and the determination of the optimum lens focus position;
determining whether the image pickup detector has completed determining the optimum lens focus position at the time the second type of input is received;
when it is determined that the image pickup detector has completed determining the optimum lens focus position at the time the second type of input is received:
picking up the image using the determined optimum lens focus position; and
controlling the recording device to record only the pickup image picked up using the determined optimum lens focus position, among the plurality of pickup images, to the memory; and
when it is determined that the image pickup detector has not completed determining the optimum lens focus position at the time the second type of input is received:
picking up the image a plurality of times by controlling the image pickup detector to move the focus lens to the plurality of different lens focus positions in sequence and to pick up the image at the plurality of different lens focus positions; and
controlling the recording device to record the plurality of pickup images to the memory.

2. The image pickup apparatus according to claim 1, wherein the second type of input corresponds to a shutter release button being fully pressed, and the first type of input corresponds to the shutter release button being partially pressed.

3. The image pickup apparatus according to claim 1, further comprising a determination completion notification part for notifying the user by at least one of a display and a speaker when the image pickup detector determines the optimum lens focus position while the first type of input is received continuously.

4. A method for picking up an image using a solid state image pickup device, the method comprising:
receiving a first type of input from a user;
receiving a second type of input from the user;
in response to receiving the first type of input from the user, initiating picking up an image using a plurality of different lens focus positions, by moving a focus lens to the plurality of different lens focus positions and pickup up the image at each of the plurality of different lens focus positions;
determining an optimum lens focus position for picking up the image based on the plurality of pickup images;
determining whether the determination of the optimum lens focus position is complete at the time the second type of input is received;
when it is determined that the determination of the optimum lens focus position is complete at the time the second type of input is received:
picking up the image using the determined optimum lens focus position; and
recording only the pickup image picked up using the determined optimum lens focus position, among the plurality of pickup images, to a memory; and
when it is determined that the determination of the optimum lens focus position is incomplete at the time the second type of input is received:
picking up the image a plurality of times by moving the focus lens to the plurality of different lens focus positions in sequence and picking up the image at the plurality of different lens focus positions; and
recording the plurality of pickup images to the memory.

5. The method of claim 4, wherein the second type of input corresponds to a shutter release button being fully pressed, and the first type of input corresponds to the shutter release button being partially pressed.

6. The method of claim 4, further comprising notifying the user by at least one of a display and a speaker when the optimum image pickup condition has been determined.

7. A computer-readable storage medium storing an image pickup control program for causing a computer to execute an image pickup control method using a solid state image pickup device, the method comprising:
receiving a first type of input from a user;
receiving a second type of input from the user;
in response to receiving the first type of input from the user, initiating picking up an image using a plurality of different lens focus positions, by moving a focus lens to the plurality of different lens focus positions and pickup up the image at each of the plurality of different lens focus positions;
determining an optimum lens focus position for picking up the image based on the plurality of pickup images;
determining whether the determination of the optimum lens focus position is complete at the time the second type of input is received;
when it is determined that the determination of the optimum lens focus position is complete at the time the second type of input is received:
picking up the image using the determined optimum lens focus position; and
recording only the pickup image picked up using the determined optimum lens focus position, among the plurality of pickup images, to a memory; and
when it is determined that the determination of the optimum lens focus position is incomplete at the time the second type of input is received:
picking up the image a plurality of times by moving the focus lens to the plurality of different lens focus positions in sequence and picking up the image at the plurality of different lens focus positions; and
recording the plurality of pickup images to the memory.

* * * * *